United States Patent [19]
Schmalz et al.

[11] Patent Number: 5,933,305
[45] Date of Patent: Aug. 3, 1999

[54] ARC FAULT DETECTOR COMPARING INTEGRATED INTERVAL TO INTERVAL FILTERED LOAD CURRENT AND CIRCUIT BREAKER INCORPORATING SAME

[75] Inventors: Steven Christopher Schmalz, Greenfield; Joseph Charles Zuercher, Brookfield, both of Wis.

[73] Assignee: Eaton Corporation, Cleveland, Ohio

[21] Appl. No.: 09/088,816

[22] Filed: Jun. 2, 1998

[51] Int. Cl.⁶ ...................................................... H02H 3/00
[52] U.S. Cl. .................................. 361/42; 361/93; 361/78; 361/115
[58] Field of Search .............................. 361/93, 115, 78, 361/62, 64, 66, 42, 45

[56] References Cited

U.S. PATENT DOCUMENTS

| | | | |
|---|---|---|---|
| 5,224,006 | 6/1993 | MacKenzie et al. | 361/45 |
| 5,452,223 | 9/1995 | Zuercher et al. | 364/483 |
| 5,682,101 | 10/1997 | Brooks et al. | 324/536 |
| 5,691,869 | 11/1997 | Engel et al. | 361/42 |

*Primary Examiner*—Stephen W. Jackson
*Attorney, Agent, or Firm*—Martin J. Moran

[57] ABSTRACT

Arc faults are detected by bandpass filtering the current to generate a sensed current signal with a pulse each time an arc is struck. A resettable integrator integrates this sensed current repetitively over equal time intervals such as each cycle of the ac current. The integrated value of the sensed current is compared with the value for the previous corresponding time interval stored in a sample and hold circuit, with the indications of interval to interval increases and decreases in the integrated sensed values for a selected number, such as six, of the most recent time intervals stored in a shift register. For each time interval, a chaos detector counts the number of changes between increases and decreases for the selected number of most recent corresponding time intervals and accumulates a weighted sum of the counts which is time attenuated. When the sum reaches a predetermined amount, an output such as a trip signal for a circuit breaker is generated.

16 Claims, 3 Drawing Sheets

ARC FAULT DETECTOR COMPARING INTEGRATED INTERVAL TO INTERVAL FILTERED LOAD CURRENT AND CIRCUIT BREAKER INCORPORATING SAME

BACKGROUND OF THE INVENTION

1. Field of the Invention

This invention relates to apparatus for detecting and interrupting currents in circuits experiencing arc faults. More particularly, it relates to arc fault detectors and circuit breakers incorporating them which respond to arc faults of a magnitude below the rated current for the circuit.

2. Background Information

Arc faults can occur in electrical systems for instance, between adjacent bared conductors, between exposed ends of broken conductors, at a faulty connection, and in other situations where conducting elements are in close proximity. Arc faults typically have high resistance so the arc current is below the trip thresholds of conventional circuit breakers. In particular, series arcs by their nature are limited by the load and, therefore, draw currents no greater than rated current for the circuit breaker. Even so, the arcs can cause damage or start a fire if they occur near combustible material.

Much attention has been directed toward trying to distinguish series and parallel arcing currents from other intermittent currents. It has been recognized that arcing currents generate a step increase in current when the arc is struck. However, many typical loads generate a similar step increase, such as for instance, when the device is turned on. In many instances the step increases generated by these loads are singular events while an arc fault generates a series of step increases. The arc fault detector described in U.S. Pat. No. 5,224,006 counts the step increases in current and generates a trip signal if a selected number of step increases occur within a given interval. However, there are loads which also generate repetitive step increases in current. This problem is addressed by the arc fault detector in U.S. Pat. No. 5,691,869 in which the arcing current is passed through a bandwidth limited filter which generates pulses having an amplitude proportional to the step increases. The arcing indication is generated when a time attenuated accumulation of these pulses reaches a predetermined value. Thus, a few very large magnitude step increases within a period of time, or a larger number of more modest step increases within a similar time period, generate a trip signal.

The above arc fault detectors primarily respond to step increases in current which exceed the rated current of the circuit breaker in which they are typically incorporated to avoid false trips in response to current signatures similar to arc faults produced by many household appliances. Presently, comprehensive arc fault detection requires complex signal processing of the current signatures requiring expensive electronic hardware. For instance, the arc fault detector described in U.S. Pat. No. 5,452,223 compares successive cycles of the arc current point by point and then applies a set of rules to the comparison to identify an arc fault. This requires expensive processing such as by a microcomputer which adds substantially to the cost of the detector.

There is a need, therefore, for an improved detector and circuit breaker incorporating the same for responding to arc faults.

In particular, there is a need for such an arc fault detector which responds to arc faults below as well as above the rated current of the circuit breaker and avoids false tripping in response to somewhat similar current signatures produced by some loads.

There is an important need for such an improved arc fault detector which can be produced economically.

SUMMARY OF THE INVENTION

These needs and others are satisfied by the invention which is directed to an arc fault detector in which a sensed current signal, from which at least the fundamental frequency component has been removed, is repetitively integrated by integrating means over equal time intervals to generate integrated sensed current values. At the present, the preferred duration of the time intervals is one cycle of the ac current. However, other time intervals greater or less than a cycle could be used. Comparing means compares the integrated sensed current value for the most recently completed time interval with the integrated sensed current value for the immediately previous corresponding time interval to generate indications of interval to interval increases and decreases in the integrated sensed current values. Storing means store the indications of interval to interval increases and decreases for a selected number of the most recently completed time intervals. Output means generates an arc fault signal as a function of the count of changes between indications of interval to interval increases and decreases for the selected number of most recently completed time intervals stored by the storing means. Preferably, the output means includes means generating an accumulation of the counts generated for the selected number of most recently completed time intervals during each successive time interval, and means generating the arc fault signal when this accumulation reaches a predetermined amount. Most preferably, the means generating the accumulation weights the counts that are added to the accumulation to give more weight to counts accumulated during time intervals with higher counts, that is, time intervals where there are more interval to interval changes between increases and decreases in the counts. If there is a change between each of the time intervals in the selected set of time intervals, no count is added to the accumulation as this in itself is a regular pattern.

Preferably, the means for generating the accumulation also includes means time attenuating the accumulation so that a fewer number of successive time intervals with high counts are needed to generate the arc detection signal. This increases the sensitivity to greater arcing activity and speeds up the response of the detector.

Also preferably, the input means includes a bandpass filter with a bandpass selected to produce a pulse in the sensed current signal each time an arc strikes in the electrical system.

The invention also embraces a circuit breaker incorporating the novel arc fault detector.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
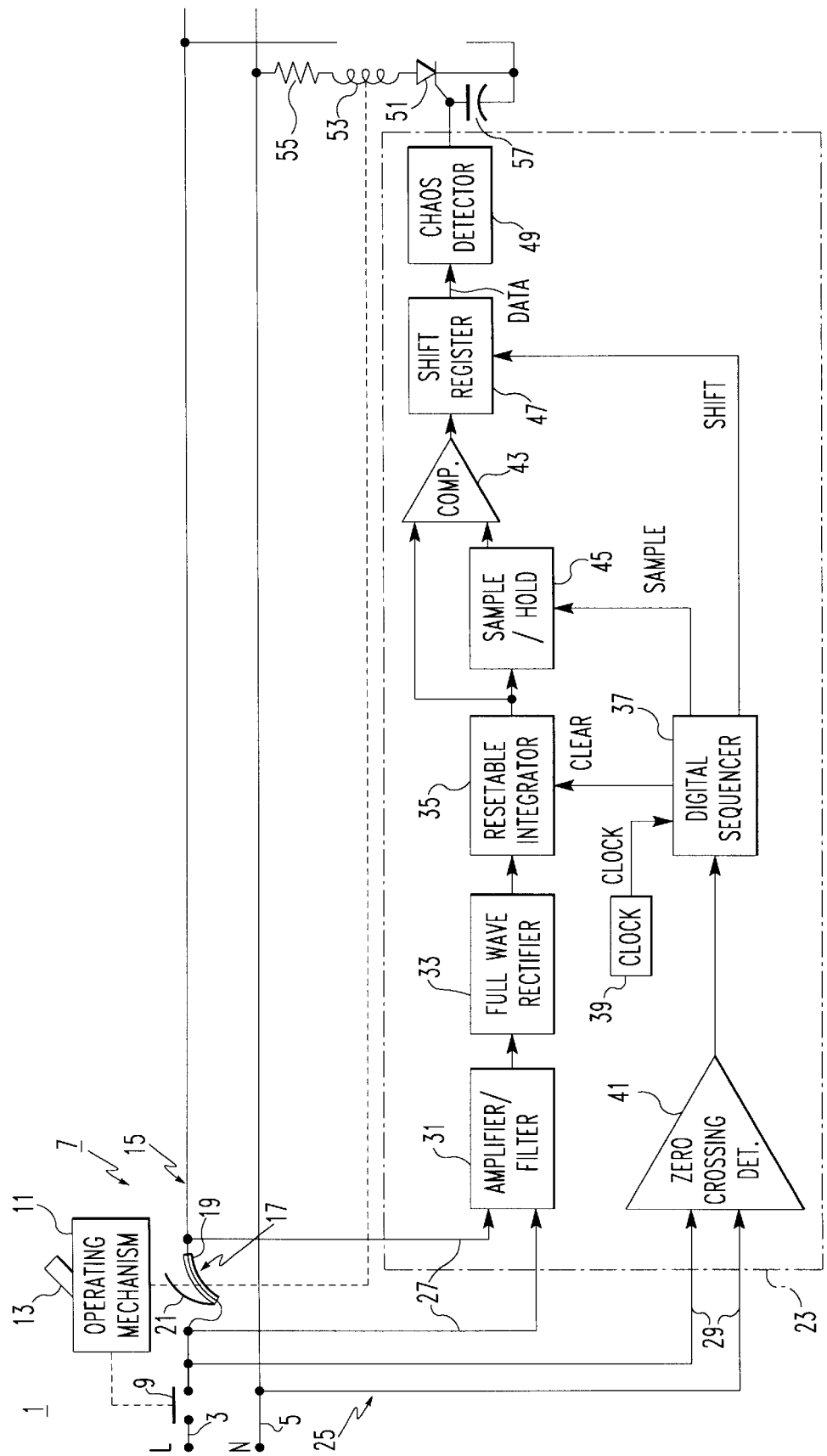
FIG. 1 is a schematic circuit diagram, mostly in block form, of a circuit breaker incorporating the invention.

Referring to FIG. 1, an electrical distribution system 1 has a line conductor 3 and a neutral conductor 5. A circuit breaker 7 provides protection for the distribution system 1. The exemplary circuit breaker 7 is a miniature circuit breaker commonly used in residential and light commercial applications. It will be appreciated, however, that the invention can also be applied to other types of circuit breakers and that the arc fault detector as will be seen as incorporated in the circuit breaker 7, can be used independently of a circuit breaker.

The circuit breaker 7 includes a set of separable contacts 9 connected in the line conductor 3. An operating mechanism 11 opens and closes the separable contacts 9 through manual manipulation of a handle 13. The circuit breaker 7 also includes a trip unit 15 which can automatically actuate the operating mechanism 11 to open the separable contacts 9 in response to certain current conditions in the system 1. This trip unit 15 includes a conventional thermal-magnetic trip device 17 which responds to overcurrents in the electrical system 1 greater than a rated current. As is well known, the thermal-magnetic trip device 17 includes a bimetal 19 connected in the line conductor 3. The bimetal 19 bends in response to persistent overcurrent conditions to actuate the operating mechanism 11 and open the contacts 9. The thermal-magnetic trip device 17 also includes an armature 21 which responds to very large overcurrents such as caused by short circuits to provide an instantaneous trip function through actuation of the operating mechanism 11.

The trip unit 15 also includes an arc fault detector 23. The arc fault detector 23 has an input 25 which provides a measure of the current in the line conductor 3 and the line voltage. A signal representative of the current in the line conductor 3 is generated as the voltage drop across the bimetal 19 as sensed by the leads 27. The input 25 senses the line voltage through the leads 29.

The signal representative of the current in the line conductor is applied to the amplifier filter 31 which includes an amplification stage and a filter which at least removes the fundamental component of current. Preferably, the filter is a bandpass filter which generates a sensed current signal containing a pulse each time an arc is struck. In the exemplary embodiment of the invention this bandpass filter has a center frequency of 530 and 3 db points at 260 Hz and 1,250 Hz. This sensed current signal generated by the amplifier/filter 31 is converted to a unipolar signal by a precision full wave rectifier 33. The unipolar sensed current signal is then integrated in the resettable integrator 35. The sensed current signal is integrated by the resettable integrator 35 repetitively over intervals of equal duration. The integration time is controlled by a digital sequencer 37. In the preferred embodiment of the invention, the interval is one cycle of the ac current. However, other intervals greater or less than a cycle in duration could be utilized. The digital sequencer 37 receives input from a clock 39 and from a zero crossing detector 41 so that the integration intervals are synchronized to the line. It is not necessary that the integration intervals begin and end with a cycle, but each interval must start and end at the same point in a cycle. Alternatively, the timing of intervals could be performed by an internal clock.

In accordance with the invention, the integrated value of the sensed current is compared interval to interval, which in the exemplary system is cycle to cycle. This comparison is implemented by applying the output of the resettable integrator 35 to a voltage comparator 43 and to a sample and hold circuit 45. As will be seen, the sample and hold circuit 45 stores the integrated sensed current value for the last cycle to be compared with the present cycle in the comparator 43. The comparator 43 outputs a one bit binary signal which indicates whether the integrated sensed current value for the present cycle indicates an increase or a decrease over the integrated sensed current value for the previous interval. This indication of an increase or decrease in the integrated sensed current value is stored for a selected number of the most recent cycles in a shift register 47. In the exemplary embodiment of the invention, the shift register 47 has six bits and is therefore capable of storing the indications of increases and decreases for the six most recently completed intervals. Selection of a particular number of the most recent intervals involves balancing selection of enough intervals to minimize false tripping against response time. The exemplary choice of the six most recent intervals appears to strike a reasonable balance. However, more or fewer intervals could also be used.

A chaos detector 49 analyzes the sequence of increases and decreases stored in the shift register 47 for randomness in a manner to be discussed. If an arcing fault is detected, the chaos detector 49 generates a trip signal which turns on a switch such as a silicon controlled rectifier (SCR) 51 to energize a trip solenoid 53 connected between the line conductor 3 and the neutral conductor 5. A resistor 55 limits the current drawn by the trip solenoid 53 and a capacitor 57 prevents nuisance tripping in response to noise. Energization of the trip solenoid 53 actuates the operating mechanism 11 to open the contacts 9.

Figure 2:
FIG. 2 is a waveform diagram illustrating timing signals generated by the sequencer which forms part of the arc fault detector in accordance with the invention.

In the exemplary embodiment of the invention the digital sequencer 37, the shift register 47 and the chaos detector 49 are implemented in a field programmable gate array (FPGA). FIG. 2 illustrates the signals related to the digital sequencer 37. The first is the CLOCK signal 59 generated by the clock 39. The second signal 61 is the START signal generated by the zero crossing detector 41. The signal 63 is a SHIFT signal which is applied to the shift register 47. This SHIFT signal discards the oldest increase or decrease indication and inputs at the other end a DATA signal generated by the voltage comparator 43. The digital sequencer 37 also generates a SAMPLE signal 65 which is applied to the sample and hold circuit 45, and a CLEAR signal 67 which is applied to the resettable integrator 35. The sequence of the signals 61–67 in FIG. 2 shows that at the beginning of a cycle, the shift register stores the last comparison of the most recently completed cycle with the previous cycle in response to the SHIFT signal. The sample and hold circuit 45 then stores the integrated sensed current value in the integrator 35 for the most recently completed interval as the last cycle value in response to the SAMPLE signal. The integrator 35 is then reset by the CLEAR signal. This sequence is repeated for each interval which is each cycle for the exemplary detector.

Figure 3:
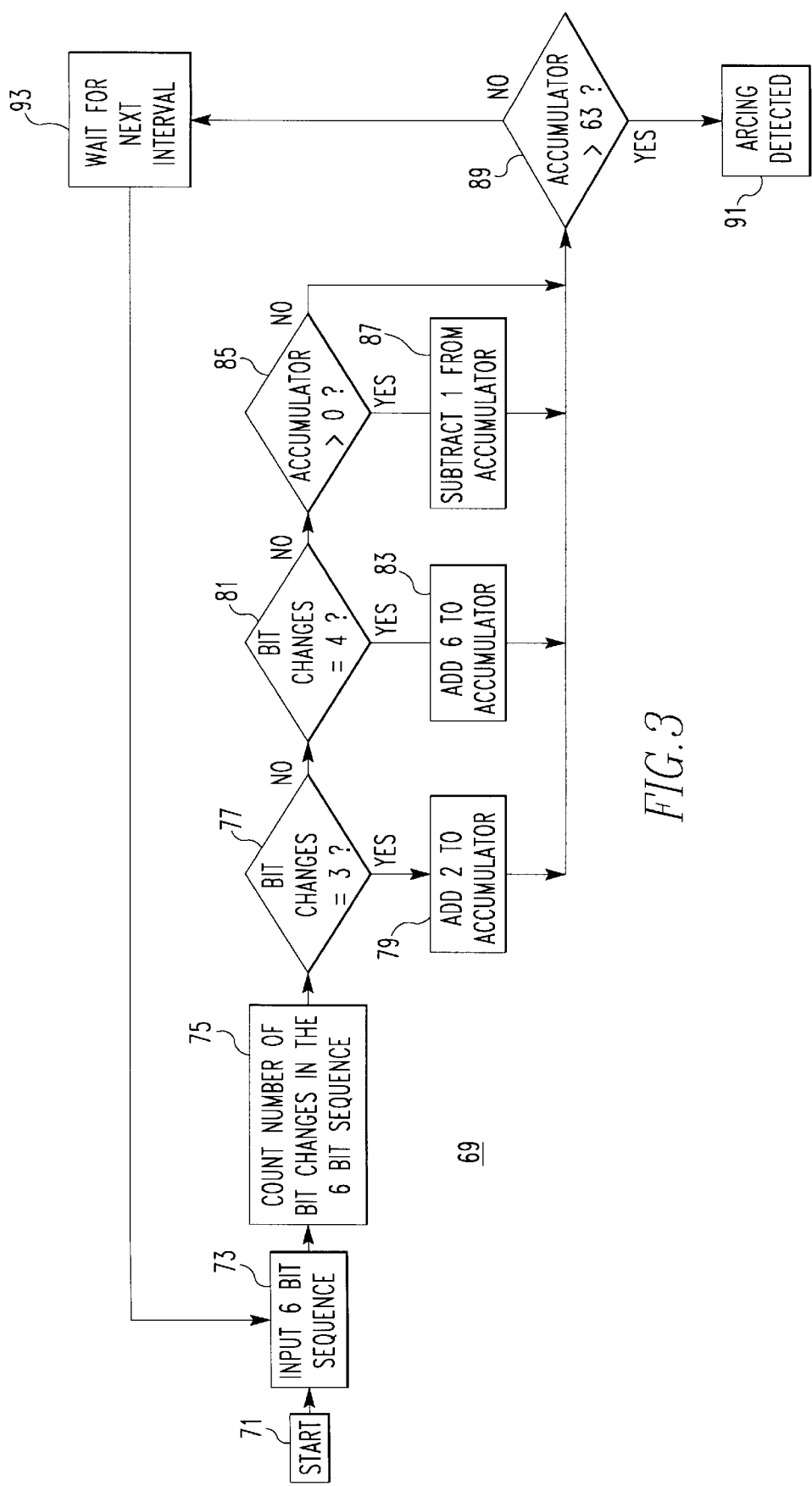
FIG. 3 is a flow chart of the logic utilized by the arc fault detector which is incorporated in the circuit breaker of FIG. 1.

FIG. 3 illustrates a flow chart for the logic for the chaos detector 49. As previously mentioned, the chaos detection logic looks for randomness in the integrated sensed current signal, as represented by changes in the increase and decrease indications from interval to interval. Thus, upon starting up at 71 a loop is entered at 73 by inputting the six bit sequence stored in the shift register 47. The bit changes in the six bit sequence are then counted at 75. However, as also previously mentioned, the counts are weighted in order to improve sensitivity to the more random signals. Thus, if three bit changes in the six bit sequence are detected at 77, 2 is added to the accumulator at 79. On the other hand, if four bit changes were detected at 81, then 6 is added to the accumulator at 83. As long as there is a count in the accumulator as determined at 85, it is time attenuated by subtracting 1 from the accumulator at 87. If the sum in the accumulator reaches a predetermined amount, such as in the exemplary system 63, as determined at 89, then an arcing fault signal is generated at 91. Otherwise, the routine waits at 93 for the next interval.

It will be noticed from the flow chart of FIG. 3 that if the number of bit changes is less than three, nothing is added to the accumulator as such a low count is not an indication of randomness associated with an arcing fault. Similarly, it will be noticed that if the count is five, which means that there has been a change between each of the six most recent intervals, nothing is added to the accumulator either because this indicates a repetitive pattern which is not random.

By way of example, in the preferred embodiment of the invention, the comparator 43 generates a zero if the integrated value for the present interval has decreased over or remains equal to that for the previous interval, and a one if it has increased. The shift register 47, then stores these ones and zeroes as indications of interval to interval increases and decreases for the selected, for example six, of the most recently completed time intervals. The chaos detector 49 then counts the number of changes between increases and decreases in the selected number of most recently completed intervals, weights the count and adds it to an accumulator. As a non-limiting example, if the sequence stored in the shift register is: 011010, the count is four which is weighted by adding six to the accumulator rather than four. When the accumulation reaches a predetermined amount, such as 63 in the exemplary embodiment, a trip signal is generated. During each interval, the accumulation is time attenuated by subtracting one.

In determining the increases and decreases, the integrated value of the most recently completed time interval is compared with that of the immediately previous corresponding time interval. When the time interval is a cycle or an integer multiple of a cycle, the most immediately previous time interval is the corresponding interval. However, where the time interval is a fraction of a cycle, or a non-integer multiple of a cycle the immediately previous corresponding time interval is not the most immediately previous time interval, but is the most recent interval for the same fractional part of a cycle or the same portion of cycles. For instance, if the time interval is a quarter cycle, the immediately previous corresponding time interval would be the immediately previous time interval for the corresponding quarter of a cycle. If the interval were 1 ½ cycles, it would be the second most previous 1 ½ cycle interval.

The arc fault detector of the invention provides a low cost device for responding to arcing faults, especially those having a low magnitude such as below the rated current of a circuit breaker in which the detector is incorporated or with which the detector is used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An arc fault detector for an ac electrical system, said arc fault detector comprising:

input means generating from current flowing in said ac electrical system a sensed current signal from which at least a fundamental frequency component has been removed;

integrating means repetitively integrating said sensed current signal over equal time intervals to generate integrated sensed current values;

comparing means comparing said integrated sensed current value for the most recently completed time interval with said integrated sensed current value for the immediately previous corresponding time interval to generate indications of interval to interval increases and decreases in said integrated sensed current values;

storing means storing said indication of interval to interval increases and decreases for a selected number of the most recently completed corresponding time intervals; and output means generating an arc fault signal as a function of a count of changes between said indications of interval to interval increases and decreases for said selected number of most recently completed corresponding time intervals stored by said storing means.

2. The arc fault detector of claim 1 wherein said output means comprises means generating an accumulation of said counts generated for said selected number of most recently completed corresponding time intervals during each successive interval and means generating said arc fault signal when said accumulation reaches a predetermined amount.

3. The arc fault detector of claim 2 wherein said means generating an accumulation includes means weighting counts added to said accumulation to give more weight to counts accumulated during time intervals having higher counts.

4. The arc fault detector of claim 2 wherein said integrating means integrates said sensed current signal over time intervals of one cycle.

5. The arc fault detector of claim 2 wherein said means generating said accumulation includes means time attenuating said accumulation.

6. The arc fault detector of claim 2 wherein said means generating said accumulation, adds no count to said accumulation for time intervals in which a change between said indications of interval to interval increases and decreases occurs between each of said selected number of corresponding time intervals.

7. The arc fault detector of claim 6 wherein said means generating said accumulation includes means time attenuating said accumulation.

8. The arc fault detector of claim 7 wherein said means generating said accumulation includes means weighting counts added to said accumulation to give more weight to counts accumulated during time intervals having higher counts.

9. The arc fault detector of claim 1 wherein said integrating means integrates said sensed current signal over time intervals of one cycle.

10. The arc fault detector of claim 1 wherein said input means comprises a bandpass filter with a bandpass selected to produce a pulse in said sensed current signal each time an arc strikes in said electrical system.

11. A circuit breaker with arc fault protection comprising:

a set of separable contacts;

an operating mechanism operative to open said separable contacts in response to trip signals; and trip means comprising:

overcurrent trip means responsive to current in an ac electrical system greater than a rated current to trip said operating mechanism; and arc fault trip means comprising:
> input means responsive to current in said ac electrical system including currents less than said rated current containing step changes such as occur when an arc is struck in said ac electrical system for generating a sensed current signal;
>
> integrating means repetitively integrating said sensed current signal over equal time intervals to generate integrated sensed current values; and
>
> means generating an arc fault trip signal to trip said operating mechanism as a function of the number of times said integrated value of said sensed current signal changes between an increase and a decrease in successive corresponding time intervals over a running set of a selected number of most recently completed corresponding time intervals.

12. The circuit breaker of claim 11 wherein said integrating means integrates said sensed current signal over time intervals of one cycle.

13. The circuit breaker of claim 11 wherein said means generating said arc fault signal comprises:
> comparing means comparing said integrated sensed current value for the most recently completed time interval with said integrated sensed current value for the immediately previous corresponding time interval to generate indications of interval to interval increases and decreases in said integrated sensed current values;
>
> storing means storing said indications of interval to interval increases and decreases for a selected number of the most recently completed corresponding time intervals; and
>
> output means generating the arc fault signal as a function of the count of changes between said indications of interval to interval increases and decreases in successive corresponding time intervals among said selected number of most recently completed corresponding time intervals stored by said storing means.

14. The circuit breaker of claim 13 wherein said output means ignores time intervals in which a change occurs between each of the selected number of corresponding time intervals.

15. The circuit breaker of claim 14 wherein said output means time attenuates said count of changes.

16. The circuit breaker of claim 13 wherein said output means weights said count to give more weight to time intervals during which higher counts occur.

* * * * *